United States Patent [19]

Willard

[11] Patent Number: 4,810,660

[45] Date of Patent: Mar. 7, 1989

[54] PROCESS FOR PRODUCING POTATO PATTIES

[76] Inventor: Miles J. Willard, 229 N. Lloyd Cir., Idaho Falls, Id. 83402

[21] Appl. No.: 224,112

[22] Filed: Jul. 25, 1988

Related U.S. Application Data

[63] Continuation-in-part of Ser. No. 944,239, Dec. 18, 1986, abandoned.

[51] Int. Cl.$^4$ .............................................. A23L 1/216
[52] U.S. Cl. ................................... 426/272; 426/438; 426/637; 426/808
[58] Field of Search ............... 426/637, 438, 272, 509, 426/518, 519, 520, 524, 512, 808

[56] References Cited

U.S. PATENT DOCUMENTS 4,419,375 12/1983 Willard et al. ...................... 426/637

*Primary Examiner*—George Yeung
*Attorney, Agent, or Firm*—Hopkins, French, Crockett, Spriner & Hoopes

[57] ABSTRACT

A hash brown potato patty is formed from fresh potato shreds and a dry binder, deep fat fried and frozen for subsequent reheating in a conventional household toaster. The dry binder is made from fresh potato pieces which are blanched, frozen, ground to appropriate size, dried at a temperature below the resolubilization temperature of retrograded amylose and subsequently added to the potato shreds. The potato shreds are made by blanching and cooling fresh potato pieces and holding at a reduced temperature for a predetermined period of time. After shredding, water and the dry binder are mixed with the potato shreds, such that the dry binder is uniformly hydrated and dispersed within the shreds. During frying, the retrograded amylose in the binder forms an essentially continuous film around the periphery of the patty, reducing the oil absorption during frying and subsequent release during reheating. The dry binder can be made from other sources of potato solids, such as mashed potatoes, rehydrated, dehydrated potatoes, or reject fresh potato pieces from commercial potato processing.

36 Claims, No Drawings

PROCESS FOR PRODUCING POTATO PATTIES

CROSS-REFERENCE TO RELATED APPLICATIONS

This is a continuation-in-part of Ser. No. 944,239 filed 12/18/86, now abandoned.

BACKGROUND OF THE INVENTION

This invention relates to the production of a dry binder product which when added to potato solids and formed into appropriate shapes for freezing, may be thereafter reheated in a conventional household toaster, microwave oven or conventional oven. The potato solids may be specially treated to reduce oil absorption during frying and subsequent oil drip when reheated. In a preferred embodiment, the invention comprises the addition of the dry binder to potato shreds which are formed into hash brown potato patties, and subsequently reheated in a pop-up toaster.

As convenience foods become an ever-increasing portion of our daily diet, food manufacturers, and in particular, potato processors, are continuing to search for products which are susceptible to quick and convenient preparation as a breakfast accompaniment. Breakfast is the last of the major meals to experience significant product development in prepared foods. With the exception of pop-up toaster pastries, there has been relatively little incursion by convenience foods into the homeprepared breakfast market. Therefore, there is a significant incentive to provide consumers with convenient products susceptible to rapid preparation.

Hash brown potatoes have most often been prepared for home use either by frying shredded fresh or cooked potatoes or frozen hash brown patties in a skillet or on a griddle. While it is certainly possible to prepare fresh hash brown potatoes, it certainly is not convenient or quick and few people have been willing to undertake the process. Therefore, most hash brown consumption has involved reheating frozen hash brown patties in an oven or in hot oil in a skillet. The increasing popularity of microwave ovens has prompted the development of frozen hash brown patties intended for reheating in a microwave oven. While neither of these methods involves the degree of preparation associated with fresh hash brown potato patties, it is either quite messy (in the case of skillet preparation), time consuming (in the case of oven preparation), or results in a product having relatively high oil levels (on the order of 10% to 20% oil). Therefore, consumers have been forced to "pay a price", in terms of calories, in return for the convenience of frozen hash brown potatoes.

As a means of overcoming these, and other, difficulties, a frozen hash brown potato patty was disclosed in U.S. Pat. No. 4,419,375, commonly assigned with the instant application, and incorporated by reference herein. In the U.S. Pat. No. 4,419,375, a hash brown potato patty intended for reheating in a conventional household toaster was disclosed. A process was disclosed wherein a cooled or frozen natural potato binder containing gelatinized, retrograded starch, was finely divided to rupture the potato cells containing the gelatinized starch. Therefore a non-sticky natural potato binder was formed which held together potato shreds to form a potato patty. The patty was thereafter deep fat fried and frozen for toaster reheating.

While the process of the U.S. Pat. No. 4,419,375 provided a product which could indeed be reheated in a pop-up toaster, three very significant problems where observed in the process. Firstly, in order to retrograde the amylose content of the starch in the potatoes, it was found that the potatoes should be held at temperatures below 50° F. until the necessary reduction in soluble starch occurred as a result of the retrogradation. A sixteen hour hold time at 50° F. was required, or proportionately shorter periods of time at lower temperatures. Secondly, the amount of "oil drip" was found to present a significant, and potentially dangerous, problem. "Oil drip" in this context refers to the amount of oil from a previously deep fat fried and frozen potato patty which drips out of the frozen patty upon reheating in a household toaster. Because such toasters utilize conductive heat from heating elements which are at approximately 1200° F. (649° C.), any highly flammable substance which is in close proximity to such elements raises the possibility of fire. The ignition temperature of most vegetable oils, such as those used in the frying of hash brown potato products, is approximately 700° F.(371° C.). Therefore, any significant oil drip inside a conventional toaster raises the specter of fire, either immediately or after a build-up of oil drip over a period of time. In a pilot plant evaluation of various binders disclosed in the U.S. Pat. No. 4,419,375, average oil drip during toasting, in milligrams, averaged from 142 mgs per patty to 990 mgs per patty (see example 7). Thirdly, because the U.S. Pat. No. 4,419,375 process used potatoes having a relatively low solids content, and because the solids content of the frozen binder added thereto was not sufficient to raise the total solids content to the desired 21–24% ranges it was necessary to partially dry the potato shreds. Such predrying produced a sticky, hard-to-manage mass.

Various other prepared frozen potato products have been suggested for toaster preparation. U.S. Pat. No. 3,634,105 disclosed a toaster hash brown potato patty utilizing fabricated potato shreds made from potato granules. A frozen toaster french fry product made from a dough comprising a potato base, water, oil and high amylose starch is disclosed in U.S. patent number 4,135,004. The amylose constituted almost 15% of the total nonfat solids of the product, and therefore would not thoroughly gelatinize until heated above 130° C. Finally, toaster french fries have been made and consumer tested according to U.S. Pat. Nos. 4,007,292 and 4,238,517. As with the product of U.S. Pat. No. 3,634,105, these products were withdrawn from the market because of high toaster drip, and reportedly, a number of fires resulting therefrom.

U.S. Pat. No. 3,597,227, Murray et al., discloses an amylose coating material for application to potato products for deep fat frying in order to enhance the appearance, texture and taste characteristics of the resulting products. The potato products to be fried are coated with from about 0.002% to about 0.02% of the amylose product.

A processed potato chip snack, comprising dehydrated potato products and water, having a moisture content of 25%–70% and heated to a temperature sufficient to effect a conversion of retrograded amylose, is disclosed in U.S. Pat. No. 3,830,949. When heated, the retrograded amylose is at least partially converted to its original soluble form. The moist product may then be either directly sheeted and fried into a potato chip-like snack, or dried to a stable moisture content for subsequent frying. Such subsequent drying must be accomplished before the amylose fraction again retrogrades and becomes insoluble. U.S. Pat. No. 3,751,268, Van Patten et al., discloses a process for preparing deep fat fried products, such as french fried potatoes, wherein the potatoes are coated with from 0.1% to 1.5% of an unmodified ungelatinized high amylose starch having an amylose content of at least 50%. It is said that the resulting product, when fried, absorbs from about 10% to about 20% less oil than conventionally fried products. Oil pickup was shown to be from 7% to about 11% of the finished product.

Various methods for preparing hash brown potatoes have been disclosed in the prior art. U.S. Pat. No. 2,748,814, to Rivoche, describes a method for making frozen food patties in which the comminuted food particles are coated with an edible cellulose gum which gels when heated to hold the potato pieces together. A similar thermal binding system is described in U.S. Pat. No. 3,399,062, to Willard et al., in which fabricated french fried potatoes are produced. Likewise, U.S. Pat. No. 3,410,702, to Frank, describes a process for adding dehydrated riced and diced potatoes for making hash brown potatoes to be subsequently fried in a skillet. The reconstituted riced potatoes contain sufficient free amylose to hold the reconstituted diced potatoes together when fried.

Therefore, there is a need for products and processes which will permit the easy and economical processing of potato products into hash brown potato patties, which when fried, frozen and subsequently reheated in a household toaster, result in a potato patty simulating those made from freshly shredded potatoes while reducing the oil drip which can lead to disastrous toaster fires. The present invention provides a method for preparing a dry binder material, which when added to fresh potato shreds, provides a hash brown potato patty having reduced oil uptake upon frying, and reduced oil drip upon reheating.

SUMMARY OF THE INVENTION

Briefly, a dried potato binder is mixed with potato solids and formed into a potato product which can be fried, frozen and subsequently reheated. In a preferred embodiment, the dry binder is mixed with potato shreds and formed into a hash brown patty. The dry binder can be made from any suitable potato source, such as reject pieces from french fried potato lines. These fresh potato pieces are blanched, cut to size if not already sized, frozen in order to retrograde the amylose content of the starch in the potatoes, dried to below 8% moisture content, ground to pass through a standard U.S. 40 mesh screen, and then added to the potato solids. In the preferred embodiment, the shreds are made from whole fresh potatoes which are washed, peeled, sliced, blanched, cooled for a period of time sufficient to permit the potatoes to equilibrate at a temperature low enough to substantially retrograde the potato starch therein, shredded, and mixed with the dry binder and sufficient water to permit relatively uniform hydration of the binder. Because the starch in the binder has been retrograded, and the stickiness therefore substantially reduced, when hydrated the binder can be uniformly distributed on the surface of the potato shreds. When adequately mixed, the shreds may be formed. e.g., into hash brown potato patties, which when deep fat fried, will maintain such shape. During frying, the retrograded amylose in the dry binder increases in temperature at the outer surface of the patty sufficiently to increase its water solubility and form an essentially continuous film around the periphery of the patty. This film of resolubilized amylose maintains the shape of the patty, and also provides an effective oil barrier that reduces oil uptake during frying and reduces oil drip during subsequent reheating, whether by toaster, microwave, or conventional oven.

These and other aspects of the invention will be more fully understood by referring to the following detailed description.

DETAILED DESCRIPTION

It is to be understood that, while the preferred embodiments of the present invention set forth below is set forth in the environment of frozen hash brown potato patties, the dry binder of the present invention is equally susceptible to use in any number of other frozen potato products which are to be reheated, either in a household toaster, microwave oven, or conventional oven. For example, the dry binder of the present invention can be incorporated into mashed potato solids which, when extruded through appropriate dies and fried, form a plurality of "french fried" potatoes, which can subsequently be reheated, broken apart and served as individual units. Or, a "mashed potato patty" or "potato pancake" can be formed with the dry binder of the present invention, fried, frozen and subsequently reheated, the final product having reduced levels of fat internally and reduced levels of oil drip when reheated.

According to the preferred embodiment of this invention, potato shreds are formed by washing and peeling raw potatoes, slicing the potatoes, and then heat-treating the slices sufficient to inactivate enzymes and gelatinize the starch naturally present in the potatoes (so-called "blanching"). Alternatively, short french fry rejects or "nubbins" can be used in the same manner. The heat-treated potato slices are then cooled to reduce the stickiness of the gelatinized starch present in the potatoes. Such cooling results in partial retrogradation of the potato starch. The potatoes are then shredded by subdividing them into long, thin, discrete shreds or strips, typically about one-sixteenth inch (0.16mm) thick and from one-half inch (12.8mm) to two inches (50mm) in length.

Briefly, the dry binder of the present invention is formed from raw potato pieces of any source, such as whole potatoes, "short cut" french fries, or other fresh-cut potato reject pieces. These potato pieces are blanched to inactivate enzymes and gelatinize the starch present in the potatoes, frozen (to retrograde the amylose component of the potato starches therein), dried at a temperature below the resolubilization temperature of retrograded potato starch and finely ground. While not preferred, the frozen potatoes can be ground and then dried under the same conditions.

In the preferred embodiment, a hash brown potato patty can be formed by adding sufficient water to the potato shreds, such that when the dry binder is added thereto sufficient water is present to uniformly hydrate the dry binder and disperse it uniformly throughout the potato shreds. Thereafter, the shred/dry binder mixture is thoroughly mixed, formed into a patty of appropriate size, fried in cooking oil, and frozen. The frozen patty may thereafter be reheated in any conventional form, such as in a household pop-up toaster, microwave oven, or conventional oven.

It had been previously proposed by applicant, in U.S. Pat. No. 4,419,375 (hereinafter "the '375 patent"), to prepare a hash brown potato patty which could be reheated, for instance, in a conventional household toaster. While this product was possibly the first toaster hash brown which could be sold with some degree of confidence that the relatively low toaster oil drip would occasion relatively few toaster fires, there still was a statistically significant possibility that such fires could occur. For example, while about 70% of a representative sample of patties made according to the '375 patent had a toaster oil drip of less than 100 mg per patty, there were examples in this sample with oil drips as high as 740 mg - certainly a level at which safety concerns are present. In addition, while the process disclosed therein may have been commercially practicable, it certainly was not optimal. For example, as disclosed in Example 5 therein (the proposed commercial process), the drying of the blanched, cooled shreds resulted in extreme stickiness on the outer surfaces of the shreds. It was deemed necessary to predry the potato shreds in order to reduce the moisture content of the potatoes sufficiently prior to forming the potato patty to result in the desired "dough" of 21-24% solids content. Because fresh potatoes typically contain 80% moisture (+/-2%) in addition to the water retained when the potatoes are blanched, partial drying of the shreds (as in a Proctor & Schwartz dryer) was the method of choice in order to increase the solids content of the dough. Without such drying, the high moisture-low solids content led not only to increased fat absorption during frying but also to a noticeable sag in frozen patty within the toaster when it was reheated. Such toaster patty sag could result in the potato product contacting the heating elements in the toaster, further increasing the risk of fire.

Addition of the frozen binder in the '375 patent, while increasing the solids content somewhat and reducing the stickiness problem to a small degree, did not alleviate the problem. Not only was the amount of drying required to raise the solids content of the resulting dough prohibitive, handling of the frozen binder required very expensive and complex processing equipment.

In order to overcome these and other problems inherent in prior art products and processes, Applicant has devised a method of producing not only the dry binder but also the potato solids in a manner which results in reduced oil uptake, reduced oil drip when frozen products are reheated, and also significantly easier processability. Applicant has found that by drying the binder at a temperature less than the resolubilization temperature of the retrograded amylose content of the potato starch for a period of time sufficient to reduce the moisture content of the binder to 8% or less, the binder can be added to potato solids in a practicable amount, which results in reduced oil pickup during frying, and reduced oil drip when reheated. The dry binder eliminates the need to dry the potato shreds, while still maintaining the solids content of the mixture (the "dough") between about 21-23 percent. The present invention has eliminated most of the processing problems previously experienced in the production of frozen fried potato products.

In the preferred embodiment, the dry binder of this invention is made by (1) blanching fresh potatoes in order to inactivate enzymes and gelatinize the potato starches present; (2) cooling at a temperature of at least as low as 50° F. (10° C.) for about 16 hours, or cooled at lower temperatures for proportionately shorter times, or, preferably, frozen, in order to retrograde the amylose fraction of the starch naturally present in the potatoes; (3) drying the retrograded blanched potatoes by conventional means, at a temperature of about 140° F. (60° C.) for a period of time sufficient to reduce the moisture content below about 8% and grinding the dry binder to pass through a standard U.S. 40 mesh (420 micron) sieve. In the preferred embodiment the binder is frozen for a period of time sufficient to freeze the potato pieces throughout. Additional freezing is not believed necessary, as the amylose retrogradation will already be substantially complete. Of course, the period of time required to effect complete freezing will be determined by the size and thickness of the potato pieces.

In an alternative embodiment, blanched potato pieces, subsequently frozen to retrograde the amylose contained in the potato cells, are finely ground while frozen. The ground, frozen mass is dried by conventional means at a temperature low enough (about 140° F.) to avoid resolubilization of the retrograded amylose. The resulting frozen, ground potato mass, which resembles mashed potatoes, can be dried on e conventional double-drum dryer or in a flash dryer followed by a fluid-bed finish dryer to achieve a final moisture content of about 7%. Any agglomerated dry binder can be put through a conventional hammermill fitted with a 420 micron screen.

The dry binder made by the process of this invention exhibits significantly improved attributes when compared to conventionally dehydrated blanched potatoes, which have heretofore been used as dry binders. For example, the water absorption by such prior art dehydrated potatoes is relatively high, since both extracellular and intercellular starch have been substantially gelatinized. However, the dry binder of the present invention has significantly reduced ability to retain water it has absorbed because of the retrogradation of the amylose fraction of the potato starch within the potato solids. When compared to the frozen binder of the '375 patent, the dry binder has an appreciably higher solids content (about 92% vs. about 20-35%, which means the desired dough solids content of 21-24% can be easily achieved without having to dry the potato shreds.

The beneficial effect of the dry binder is evident in the examples that follow. Applicant has found that by increasing the dry binder level from about 10% to about 17% (dry solids basis) of the dough Mixture, the toaster oil drip can be reduced by a factor of almost 6, and the fat content of the resulting fried hash brown potato patty can be reduced by over 20%. Applicant found it unnecessary to use a dry binder content above about 18%, but there is no reason to believe that higher levels of the dry binder would not have the same effect on extremely low solids content potatoes. For instance, a level of 50% of the dry binder would be expected to have similar effects on potatoes having a solids content of about 15-18%. Similarly, while applicant deemed about 10% binder to be adequate to reduce toaster oil drip to acceptable levels, significantly lower levels of dry binder would yield a final product having acceptable (although proportionately higher) oil drip standards.

While not preferred, cooked mashed potatoes, rehydrated dried mashed potatoes or almost any other source of potato solids can be used to produce the dry binder of this invention. The cooked, mashed potato solids can be frozen by conventional means and held indefinitely until needed. The frozen potato solids can then be subdivided by comminuting in an Urschel grinder fitted with a 0.032" (0.081 mm) opening, or smaller. The comminuted frozen potato solids are dried by conventional means, such as by a drum dryer, solid dehydration belt, or preferably an air-lift dryer in which the potato solids are injected into a rising stream of heated air and, thereafter, finish dried to 7% moisture.

Applicant has determined that a critical aspect in achieving the results reported herein relate to the preparation of the potato shreds (or other potato solids) which comprise the bulk of the finished product. The temperature to which the potato pieces are cooled after blanching, the period of time held at that temperature and the amount of water added to the cooled potatoes, all affect the final product quality. Cooling of the blanched potato solids will have a similar effect as that observed in cooling of the dry binder; the amylose portion of the potato starch will be at least partially retrograded and a synergistic effect is apparent between the retrograded potato starch of the shreds and the retrograded potato starch of the dry binder. It appears that the retrogradation step decreases the amount of water soluble starch present in the potatoes by decreasing the water solubility of the amylose component of the starch. This result is probably due to hydrogen bonding, either directly or through water molecules bridging active sites on the starch molecules. The degree of amylose retrogradation will determine the amount of water soluble starch per gram of potato solids: the greater the degree of retrogradation, the lower will be the amount of water soluble starch per gram of potato solids.

The degree of retrogradation is affected not only by the temperature to which the potato solids are subjected but the amount of time held at that temperature. For example, given a constant hold period of either 30 or 60 minutes, toaster oil drip is anywhere from five times to about seven times less severe when the temperature of the potato solids is reduced from 55° F. (12.8° C.) to 35° F. (1.7° C.). Similarly, when held at 55° F. (12.8° C.), oil drip is about one-sixth as great when held for 60 minutes as with no holding time and is approximately one-fourth when held for 60 minutes at 35° F. (1.7° C.) as opposed to no holding time. The synergistic effect is apparent when considering both the hold time and the reduced temperature; the toaster oil drip was 29 times greater when the potato shreds were cooled to 55° F. and not held, as compared to shreds that were cooled to 35° F. and held for 60 minutes The water added to the potato shreds may be added either to the dry binder prior to addition to the shreds or, preferably, can be added to the shreds prior to the addition of dry binder thereto. The amount of water added to the shreds is important from a processing standpoint; a sufficient amount of water is necessary to hydrate the dry binder added, while excess water can result in a low solids content and, therefore, higher fat absorption during frying and greater opportunity for fat loss during reheating.

It has been found that the ratio of water to dry binder should be in the range of from about 0.5:1 to about 5.0:1.0, respectively, most preferably from about 1:1 to about 2:1. Apparently, the critical aspect of water addition is to have sufficient water available to hydrate the dry binder so that it can flow throughout the potato shreds and fill the interstices therebetween, coating each of the shreds individually, and having sufficient hydrated binder available to form a continuous film around the periphery of the patty when fried.

The uniform distribution of the dry binder throughout the potato shreds is critical in the formation of the "skin" which results after frying of the patty. The hydrated binder in the outermost portion of the patty surface undergoes a rapid temperature increase at the moment of frying, causing the amylose component of the starch in the binder to resolubilize and rapidly regain its ability to hold water. The result is a continuous film of resolubilized starch on the outermost periphery of the patty, which acts as a barrier against absorption of fat into the patty. While the internal temperature of the patty remains below 100° C. (212° F.) due to the cooling effect of water being evaporated at the surface of the patty, a thin film of resolubilized binder material on the patty surface exceeds the boiling temperature of water due to the rapid heat transfer from the frying medium, typically about 374° F.(190° C.). The result is a barrier around the periphery of the patty resisting fat penetration when compared to a comparable patty made with a nonretrograded potato binder. The fat content of products made according to the present invention can be as low as 5–7%.

For the same reason that this film of resolubilized amylose prevents fat absorption during frying, the "skin" which results after cooling also prevents penetration of fat from the interior of the product into a toaster during subsequent reheating. Previous attempts to market frozen potato products intended to be reheated in household toasters have been unsuccessful due to the excessive oil drip when reheated. Such oil drip has been known to cause fires, either as a result of excess drip from the reheating of a single frozen unit or resulting from the build-up of oil in the toaster, resulting from the reheating of a number of different products.

The water-dry binder interaction is apparently important in producing a patty having a relatively smooth surface. While the surface smoothness may have some esthetic benefits, it appears that a patty having a rough exterior with a large number of shreds protruding from the surface may provide an avenue for the escape of retained fat during reheating.

It has been observed that, when binder is added without water, there is a positive correlation between the level of dry binder used and the following attributes of the finished product when reheated: lower fat content; lower average toaster drip; better patty surface rating; and higher dough solids. Even though these attributes positively correlate with the addition of the inventive dry binder, these results are significantly improved, especially in toaster oil drip, when the dry binder is hydrated with water. There does not appear to be any positive correlation between the amount of dry binder used and the stickiness of the dough, a processing variable.

The improvements provided by this invention are exemplified by the following examples.

EXAMPLES

Example 1.

Frozen Hash brown potato patties suitable for reheating in conventional household toasters were made by the following process. This process was carried out on a pilot plant scale capable of providing 70 pounds per hour of finished product.

A. Preparation of dry binder.

Chopped blanched frozen potatoes manufactured by Ore-Ida Food, Inc., under the product description "southern-style hash brown potatoes" were obtained through wholesale frozen food distributors. The frozen potatoes were broken apart and placed in a 12"×48"×4" (305 mm×1219 mm×101 mm) perforated tray to a depth of about 4" (101 mm). The drying tray was placed in a Proctor & Schwartz tray drier (model K15965) such that hot air (at about 140° F. 60° C.) was circulated over and through the bed of frozen potato products at about 400 ft/minute. Air temperature was maintained at about 140° F. (60° C.) throughout the drying cycle, which required about 4.5 hours to produce a final product having the desired moisture content of about 7% by weight. The resulting product had a light porous structure as a result of them having been frozen prior to drying. The porous potato products were ground in a Micro-Pulverizer, type 1W such that substantially all of the product passed through a U.S. 40 mesh (0.42 mm) screen. Only product which passed through the 40 mesh screen was utilized hereinafter. The screen analysis of the ground potato product (hereinafter referred to as "dry binder") was as follows:

| On U.S. #40 (0.420 mm) | 0.1% |
| --- | --- |
| On U.S. #60 (0.250 mm) | 26.3% |
| On U.S. #80 (0.177 mm) | 30.4% |
| On U.S. #100 (0.149 mm) | 10.2% |
| Through U.S. #100 | 33.0% |

Dry binder in which the amylose contained in the potato starch had been retrograded by freezing was utilized in the examples to follow.

B. Preparation of frozen hash brown patties utilizing dry binder.

Russet potatoes with an average solids content of 20.5% were peeled by standard means and cut into ¼"×¼" (6.4 mm×6.4" mm) french fry strips. The strips were then further subdivided into pieces ¾" to 1" (19 mm to 25 mm) long to simulate the raw material anticipated for use in commercial production, i.e. reject short cut french fries resulting from commercial frozen french fry processes. Fifty pounds of these potato pieces were blanched in 25 gallons (94.6 l) of 180° F. (82.2° C.) water for 5 minutes. The blanched pieces were drained and cooled for 10 minutes in running water at 55° F.(12.8° C.). They were then further cooled in water maintained at approximately 33° F. (0.6° C.) for 20 minutes, until the pieces had an average temperature of about 34° F. (1.1° C.). These cooled pieces were then drained and allowed to stand for an additional 30 minutes before further processing into hash brown patties.

The cooled potato pieces were then shredded in either an Urschel Model CC shredder or a Halde vegetable shredder to produce conventional hash brown potato pieces having an average size of 1/16"×3/16"×3/4" (1.6 mm 4.8 mm×19 mm). For producing the hash brown patties, 48.6 pounds (22.1 kg) of the water cooled shreds (the temperature having risen to about 38° F.(3.3° C.)) were blended with 2.49 pounds (1.1 kg) of dry ingredients to yield a dough having the following composition (expressed on a dry solid basis):

| Potato shreds | 80.8% |
| --- | --- |
| Dry potato binder from A | 14.8% |
| Vegetable oil | 0.4% |
| Dextrose | 1.6% |
| Salt | 2.1% |
| Sodium carboxymethylcellulose | 0.4% |

The mixing procedure was as follows: the cooled potato shreds were placed in a model L1000A Leland paddle mixer operated at 26 rpm. As the mixer was turned on, 3 pounds (1.4 kg) of cold tap water was sprinkled over the cooled pieces to uniformly moisten their surface and provide water which would be available for hydration of the dry potato binder. The blended dry ingredients (everything but the potato shreds) were then sprinkled into the moistened potato pieces over a period of 30 seconds, after which the mixing was continued for a total of 2.0 minutes. The mixture was fed into a Hollymatic model 200 patty former and formed into patties having dimensions of 2¾"×3¾"×⅜" (69.9 mm × 95.3 mm×9.5 mm), each weighing approximately 61-63 gm, at a rate of about 18 per minute. Patties were placed 12 at a time in a wire basket with metal wire channels designed to keep the upper and lower planar surfaces of the patties in a vertical position during frying. Frying was continued at 380°-385° F. (193.3° C.°-196.1° C.) for a period of 70 seconds, after which the basket was removed and excess fat was allowed to drain for 1 minute from the surface. The patties were placed on metal trays in a walk-in freezer and frozen. Upon analysis it was determined that the fat content of the frozen patties averaged 7.0% and the moisture content averaged 66%.

C. Toaster evaluation for oil drip.

Analysis of the amount of retained frying oil which is released by the frozen hash brown potato patty during reheating in a conventional household toaster was conducted according to the following procedure. A piece of aluminum foil having approximate dimensions of 3"×6½" (76 mm×165 mm) was weighed. The toaster was turned upside down and the bottom support wire was wiped clean with a clean, unused tissue. The toaster was positioned over the preweighed aluminum foil such that the foil would catch all oil drippings from the one toaster slot used. A frozen hash brown patty from B. above was placed in the slot and the toaster was turned "on" by lowering the patty into the toaster slot. The temperature setting of the toaster was set in "HIGH" position. After heating for 5 minutes, the patty was removed from the toaster. The toaster was lifted from over the foil. The foil was folded to prevent any spillage and was re-weighed, the difference from the initial foil weight being the oil drip. This procedure was repeated using the same slot of the same toaster until four (4) patties of each sample had been heated. After the four patties had been heated, the toaster was turned upside down the support wire wiped clean with a clean unused tissue. The results for each individual patty were calculated and recorded as "mg of oil drip per patty".

The mg of oil drip per patty for 12 patties prepared in this manner was 2.0, 1.5, 3.1, 1.2, 24.7, 1.0, 0.9, 11.0, 1.2, 12.2, 1.2, 11.0; resulting in an average mg of oil drip per patty of 5.9 mg and a standard deviation 7.4.

Example 2

The procedure of Example 1 was followed to product hash brown potato patties. In this Example the patties were fried in increments of 10 seconds for up to 70 seconds. After each 10 second frying time, the patties were removed, drained for 10 seconds frozen and analyzed for patty weight, moisture content and fat content. The results are shown in Table 1 below.

TABLE 1

| Sample No. | Fry Time Seconds | Patty Weight | Rate of Water Loss (gm/sec) | Moisture Content | Oil Content |
|---|---|---|---|---|---|
| A | 0  | 66.8 | —     | 76.2 | 0.24 |
| B | 10 | 68.6 | 0.247 | 72.2 | 4.3  |
| C | 20 | 65.8 | 0.235 | 71.2 | 4.9  |
| D | 30 | 63.6 | 0.224 | 69.7 | 5.6  |
| E | 40 | 61.8 | 0.213 | 69.2 | 6.1  |
| F | 50 | 59.7 | 0.203 | 67.6 | 6.6  |
| G | 60 | 58.8 | 0.194 | 66.6 | 6.9  |
| H | 70 | 57.5 | 0.184 | 66.3 | 7.2  |

As can be seen, relative water loss from the patties is greatest early in the frying cycle. It was observed that the optimum fry time was between 60 to 70 seconds, as this produced patties that were cooked all the way through and had a desirable light golden brown color. Cooking for shorter than 60 seconds resulted in undercooked product, while cooking longer than 70 seconds generally resulted in burned product.

Example 3

This example illustrates the importance of cooling the blanched potato pieces of Example 1.B before shredding and mixing with dry binder to produce the hash brown potato patty. In samples 1, 2 & 3 the blanched potato pieces were cooled in running tap water to a temperature of 55° F., and then held for periods of 0, 30 and 60 minutes. In samples 4, 5, 6, the blanched potato pieces were cooled in cold tap water and ice water to a temperature of 35° F. and then held for periods of 0, 30 and 60 minutes. The temperature of the mixture of cooled potato shreds and dry binder ingredients (hereinafter "dough") was taken, and the dough evaluated for stickiness as an indication of processability on a 5 point scale as follows:

1 = not sticky
2 = very little stickiness
3 = somewhat sticky - limit of acceptability for commercial processability
4 = difficult to operate because of stickiness
5 = not possible to form patties because of dough stickiness These patties were also evaluated for toaster drip by the process of Example 1.C.

TABLE 2

Effect of Piece Cooling Temperature & Holding Time

| Sample No. | Hold Time Minutes | Piece Temp After Cool °F. (°C.) | Dough Temp Degrees F. (C.) | Stickiness Score | Average Drip (mg) |
|---|---|---|---|---|---|
| 1 | 0  | 55 (12.8) | 58 (14.4) | 2.5 | 235 |
| 2 | 30 | 55 (12.8) | 59 (15.0) | 2.5 | 70  |
| 3 | 60 | 55 (12.8) | 60 (15.6) | 2.5 | 40  |
| 4 | 0  | 35 (1.7)  | 45 (7.2)  | 2   | 34  |
| 5 | 30 | 35 (1.7)  | 49 (9.4)  | 2   | 13  |
| 6 | 60 | 35 (1.7)  | 51 (10.6) | 2   | 8   |

Cooling and holding at a reduced temperature results in decreased toaster oil drip. Cooling to a lower temperature, an holding for a longer period of time, results in less toaster oil drip than warmer temperatures and shorter hold times. It would appear that the partial retrogradation of potato starch in the potato shreds resulting from cooling enhances the effect achieved by the dry binder. Rupture of potato cells during mixing of shreds (and subsequent forming) apparently releases and distributes gelatinized potato starch throughout the patty, which not only makes forming into a patty practicable but also aids in oil retention during reheating.

Example 4:

This example illustrates the importance of drying conditions and particle size in the preparation of dry binder.

A. The effect of the drying temperature on the frozen potato pieces was evaluated. A quantity of commercially produced "southern-style hash browns" containing 77.2% moisture was divided into three batches.

A.1. Drying conditions as generally set forth in Example 1.A, were used for drying a 40 lb. (18.2 kg) batch of the potatoes at a 6.0 inch (153 mm) depth in the drying trays. A time - temperature regime common in the commercial production of dehydrated sliced or diced potatoes was used, with the results shown in Table 3.

TABLE 3

| Time/min | Temperature °F. (°C.) | Air Direction | Net Weight/lb (kg) |
|---|---|---|---|
| 20  | 220 (104) | Down | 39.0 (17.7)  |
| 40  | 200 (93)  | Up   | 34.5 (15.7)  |
| 60  | 180 (82)  | Down | 29.5 (13.4)  |
| 90  | 160 (71)  | Up   | 22.15 (10.1) |
| 120 | 140 (60)  | Down | 15.55 (7.1)  |
| 180 | 140 (60)  | Up   | 11.45 (5.2)  |
| 240 | 140 (60)  | Down | 10.10 (4.6)  |

Final moisture content of 7.7%, (by weight) was achieved with a toaster drip of 26 mg and a standard deviation at 29 mg.

A.2. A test was conducted in which the drying temperature was held at 200° F. (93° C.) through an entire drying cycle as shown in Table 3, resulting in an average toaster drip of 225 mg, with a standard deviation of 105 mg.

A.3. In previous experiments conducted by Applicant (not reported) it appeared that a drying temperature of about 140° F. (60° C.) would be optimal for drying potatoes to be used as the dry binder. In this example a 38.55 lb (17.5 kg) batch of the potatoes was dried at about 140° F.(60° C.) throughout the 4½ hour drying cycle.

TABLE 4

| Time/hr | Temperature of (°C.) | Air Direction | Net weight |
|---|---|---|---|
| 0    | 140 (60) | Down | 38.55 (17.5) |
| 0.25 | 140 F.   | Down | 38.85 (17.7) |
| 0.5  | 147 F.   | Down | 36.0 (16.4)  |
| 0.75 | 140 F.   | Down | 35.65 (16.2) |
| 1.0  | 140 F.   | Down | 33.80 (15.4) |
| 1.25 | 140 F.   | Up   | 31.75 (14.4) |
| 1.50 | 140 F.   | Up   | 29.7 (13.5)  |
| 1.75 | 141 F.   | Up   | 27.5 (12.5)  |
| 2.0  | 140 F.   | Up   | 25.3 (11.5)  |
| 2.5  | 140 F.   | Down | 18.10 (8.2)  |
| 3.0  | 140 F.   | Down | 12.55 (5.7)  |
| 3.5  | 140 F.   | Down | 10.0 (4.5)   |
| 4.0  | 140 F.   | Down | 9.2 (4.2)    |
| 4.5  | 140 F.   | Down | 8.90 (4.0)   |

Final moisture content of this product was 6.6%, by weight, with a measured toaster oil drip of 15 mg and a standard deviation of 21 mg.

It was concluded as a result of this example that the dry binder should be dried at a temperature well below the temperature at which the potato retrogradation could be reversed at the surfaces of the dehydrated potato, which is believed to be a temperature of about 248° F.(120° C.). Therefore, a drying temperature of about 140° F.–150° F.(60–66° C.) chosen for commercial production.

B. A quantity of the frozen "southern-style hash browns" of 4.A. was divided into two equal portions. One portion was dried by the procedure set forth in Example 1. A second portion was ground while still frozen, through a Comitrol grinder fitted with a 1030 screen into a finely divided frozen particulate mass resembling snowflakes. The ground frozen potatoes were placed on cheesecloth in the drying tray and dried at 140° F.(60° C.) with occasional stirring for about 3 hours. The dried product was a friable granular mixture with some agglomerates which were reduced in size by passing the entire mixture through a conventional hammermill to produce the finely divided dry binder.

Frozen patties produced according to the process of Example 1, using this dry binder, were evaluated and found to have a toaster drip of 31 mg per patty. It would appear that frozen potato pieces can be ground and thereafter dried by any convenient means, such as a fluid bed drier or a air lift drier, to produce the preferred dry binder of this invention.

Example 5:

A series of runs were made to determine the optimum levels of dry binder and water to be added to the potato shreds in the preferred embodiment.

A. In order to determine the effect of increasing quantities of retrograded dry binder when added to blanched cooled shreds as set forth in Example 1, the potato shreds were cooled as in Example 3, to a temperature of 35° F.,(1.7° C.) drained and allowed to stand for 30 minutes. When examined under magnification it was observed that the surfaces of the individual shreds were moist but not dripping with water. After these potatoes were shredded the dry binder was added at levels of from 10.4% to 17.0%, expressed as moisture-free solids. The quantity of shreds in the mixture was reduced proportionately as the potato solids increased due to addition of more dry binder, in order to maintain roughly equivalent dough solids. Other ingredients were added as disclosed in Example 1. Patties were produced according to the process of Example 1, except that no extraneous water was added to the shreds, the patties were fried vertically, frozen and evaluated for toaster drip. The results are summarized in Table 5.

TABLE 5

| Sample No. | Usage Level % | Water Added lb. | Average Toaster Drip, mg | Fat Content % | Patty Surface Rating | Calculated Dough Solids % | Dough Stickiness Score |
|---|---|---|---|---|---|---|---|
| 1 | 10.4 | 0 | 530 | 11.1 | 4 | 21.5 | 2.5 |
| 2 | 12.5 | 0 | 305 | 10.0 | 3.5 | 22.4 | 2.5 |
| 3 | 15.0 | 0 | 182 | 9.2 | 3 | 22.4 | 3 |
| 4 | 17.0 | 0 | 92 | 8.8 | 3 | 23.0 | 3 |

A number of significant differences were observed in the products of this Example, relating to both processability and final product attributes.

For example, the dough stickiness increased from 2.5 to 3.0 as the dry binder level increased; the patty surface rating improved with higher levels of dry binder; oil drip improved significantly as the dry binder usage level increased; and the fat content decreased as the patty surfaces became smoother with addition of more dry binder. The patty surface rating is 1. Smooth. No protruding shreds; surface well sealed, no open areas.
2. Fairly smooth. Surface well sealed but with a few open areas.
3. Slightly rough. Shreds protrude from surface, or surface ridged; surface well sealed but with a few open areas.
4. Moderately rough. Similar to "3" but surface has obvious open ares.
5. Rough. Shreds protrude from surface or rough ridges; surface poorly sealed.

It should be noted that, with no added water, even the highest level of dry binder still resulted in a relatively high average oil drip (92 mg, range up to 232 mg).

B. Using the same potato shreds a second test was run in which various levels of water were added to mixtures of dry binder and potato shreds as in 5A. The results are set forth in Table 6.

This example illustrates the significance of providing sufficient free water in the mixture of potato shreds and retrograded dry binder. It appears that the water hydrates the binder sufficiently so that the retrograded amylose in the dry binder is solubilized and distributed uniformly throughout the patty, but most importantly, at the patty surface. As shown in Table 6 the level of water added to the dough mixture is expressed as the ratio of the weight of water added to the dough to the weight of dry binder used in the formulation. Therefore, in this example the ratio of water:binder ranged from 1.0:1 to 1.86:1.

TABLE 6

| Sample No. | Usage Level % | Water Added lb. (kg) | Ratio Water:Binder | Average Toaster Drip, mg | Fat Content % | Patty Surface Rating | Calculated Dough Solids % | Dough Stickiness Score |
|---|---|---|---|---|---|---|---|---|
| 1 | 10.2 | 1.35 (0.6) | 1.0:1 | 8 | 7.8 | 2.5 | 22.9 | 1.5 |
| 2 | 15.4 | 3.0 (1.4) | 1.56:1 | 2 | 7.5 | 3.5 | 21.7 | 1.5 |
| 3 | 17.9 | 4.3 (2.0) | 1.86:1 | 15 | 7.6 | 2.5 | 22.0 | 1.5 |

Observations made during the production of these samples and subsequent evaluation indicate a significant improvement of both processability and final product quality. For example, the dough stickiness score was very good in all samples; patty surface rating was good for all samples; toaster oil drip was very low for all samples, and fat content was significantly lower with water added. It would appear that, rather than increasing the fat content of the finished product, hydration of the dry binder by the added water provided a film of released gelatinized retrograded amylose around the periphery of the patty, which when fried served to reduce absorption of fat.

C. A production scale test was made on raw material similar to that used in 5A and 5B. The dry binder was added at 13.9% moisture free basis. In this test the blanched shreds were cooled by circulating refrigerated air through the shreds which resulted in partial drying of the surfaces of the pieces. Differences were also noted when processing short-cut french fries from ¼"×¼" (6.4 mm×6.4 mm) thick products and ½"×½" (12.7 mm×12.7 mm) thick products. As there is more surface area exposed when processing smaller pieces, it was found that the optimum ratio of water to binder for ¼" (6.4 mm) short-cuts was from 1.82:1 to about 2.0:1, whereas for the thicker pieces which produced larger shreds, the ratio of water to dry binder was about 1.3:1.

Example 6

Evaluations of commercially available frozen potato toaster products and other non-toaster frozen processed potato products were made in order to illustrate the advantages of the present invention.

A. Toaster hash brown potato patty products were made according to U.S. Pat. No. 4,419,375, commonly assigned. Samples were produced according to the procedure described in Examples 6 and 7 of the '375 patent as follows: Potatoes were peeled, trimmed, cut into one-half inch (12.7 mm) slabs and blanched for about 15 minutes in 180° F. (82.2° C.) water. They were cooled 20 minutes in 55° F. (12.8° C.) tap water and shredded with a Hallde 6 mm disc shredder. The shreds were predried in a Proctor and Schwartz test dryer to 15% weight loss to increase the solid content of the resulting dough to about 24%. Frozen binder was prepared by grinding southern-style hash browns through a Comitrol 1020 head. The shreds, frozen ground binder and the remaining dry ingredients disclosed in Example 1 herein were blended in a Leland mixer for a total of 2 minutes and formed into patties in the Hollymatic former. A portion of the patties (A1) was fried vertically in the laboratory fryer at 380° F. (193.3° C.) for 70 seconds. A second portion (A2) was fried horizontally in the pilot plant fryer using the best possible conditions of oil flow past the top and bottom portions of the patties. The patties were then cooled by ambient air and frozen at −20° C. Later these patties were evaluated for toaster oil drip using the 5-minute procedure of Example 1 herein. The results of these tests are compared to the product of Example 1 in Table 6.

TABLE 7

|  | Frying Position | Average Drip mg | Std. Dev. mg | Range - Drip mg |
|---|---|---|---|---|
| Example 6-A1 | vertical | 133 | 79 | 0–292 |
| Example 6-A2 | Horizontal | 216 | 140 | 0–497 |
| Example 1 | Vertical | 5.9 | 7.4 | 0–25 |

In the '375 patent column 14 lines 3–15, the then-current toaster oil drip evaluation technique is described. All examples in '375 were evaluated using a four minute residence time in the toaster. The present technique is virtually identical, except that the patties are heated for 5 minutes rather than 4 minutes. The present test provides a more severe test, as the surface of the patties is heated to a higher temperature and, all other things being equal, more oil drip would be expected after 5 minutes than after 4 minutes. The significant differences between the products of '375 and the products of this invention are readily apparent in the results disclosed in Table 7.

B. A large number of individual control samples made according to the process of Example 1 have been evaluated. The toaster oil drip of such samples, made from a number of different potato sources provided at different times, have been analyzed to prepare a frequency distribution of toaster oil drip levels, as shown in Table 8. Similar evaluations were made of a large sample size made according to the process Example 5 of the '375 patent. These products were made with the continuous Belshaw pilot plant fryer as disclosed at column 13, line 52. The toaster drip analysis was based on a five minute retention time in the toaster rather than four minutes. Results are shown in Table 8.

TABLE 8

|  | '375 Process | Process of Ex 1 |
|---|---|---|
| Retrograded binder type: | Frozen | Dry |
| Positioning during frying: | Horizontal | Vertical |
| Toaster drip - Range (mg) | Percent | Percent |
| 0–5 | 28 | 56 |
| 5–10 | 6 | 7 |
| 10–15 | 1 | 8 |
| 15–20 | 4 | 5 |
| 20–25 | 1 | 5 |
| 30–35 | 1 | 4 |
| 35–40 | 4 | 2 |
| 40–45 | 1 | 2 |
| 45–50 | — | 1 |
| 50–55 | 5 | 1 |
| 55–60 | 4 | 1 |
| 60–65 | 1 | 1 |
| 65–70 | 1 | 1 |
| 70–75 | — | 0 |
| 75–80 | 1 | 1 |
| 80–85 | — | 0 |
| 85–90 | 3 | 0 |
| 90–95 | 3 | 0 |
| 95–100 | 3 | 0 |
| 100–105 | 3 | 0 |
| 105–110 | 1 | 0 |
| 115–120 | 3 | 0 |
| 120–125 | 1 | 0 |
| 125–130 | 1 | 0 |
| 135–140 | — | 0 |
| 145–150 | 1 | — |
| 150–155 | 3 | 0 |
| 175–180 | 1 | — |
| 195–200 | 4 | 0 |
| 200–205 | 3 | — |
| 210–215 | 3 | — |
| 225–230 | 1 | — |
| 235–240 | 1 | — |
| 265–270 | 1 | — |
| 270–275 | — | 0 |
| 285–290 | 1 | — |
| 330–335 | 1 | — |
| 380–385 | 1 | — |
| 740–745 | 1 | — |
| Percent under 100 mg | 70% | 99% |
| Percent under 50 mg | 53% | 90% |

C. Samples of frozen potato products, advertising and packaging claims for which indicate susceptibility to toaster preparation, were evaluated. Toaster oil drip results are shown in Table 9. Additionally, toaster oil drip evaluations of conventional frozen potato products, intended for conventional or microwave oven preparation, are shown in table 9.

TABLE 9

| Product | Reheating Time (min) | Reheating Method | Average Oil Drip mg | Range Oil Drip |
|---|---|---|---|---|
| Pet, Inc.[1] | 3 | toaster | 170 | 98–259 |
| Mr. Dee's | 5 | toaster | 631 | 323–840 |
| Golden patties | 5 | toaster | 1643 | [2] |
| Simplot Tater-O's | 5 | toaster | 1917 | [2] |

[1]Made according to U.S. Pat. No. 3,634,105.
[2]Single samples - no range.

Example 7

This Example illustrates the effect of increased time of reheating in a toaster on final product temperature and levels of oil drip.

A. Product made according to Example 1 was used to measure the effect of toaster reheating times ranging from 3 minutes to 5 minutes on the internal patty temperature. For these tests, a GE model 3216(T86) 900 watt toaster was used, according to the procedure in Example 1C. Internal patty temperature measurements were made using a termocouple probe made by Yellow Spring Instrument Co. For this measurement the patty was removed from the toaster and placed in an insulated container. The thermocouple probe was inserted in the center of the patty from a lateral (narrow) edge. The highest temperature registered was recorded. The results of these tests are shown in Table 10.

(TABLE 10)

| Toaster Heating Time (minutes) | Internal Temp. deg F. (C.) | Std. Dev. deg F. (C.) |
|---|---|---|
| 3 | 158 (70) | 26.8 (14.9) |
| 4 | 174 (79) | 6.7 (3.7) |
| 5 | 190 (88) | 20.5 (11.4) |

It was concluded by sampling the reheated products that an internal patty temperature of from about 170°–180° which might be expected when a frozen patty is reheated for about 4 minutes, was ideal for this product. However, in an attempt to make the process as severe as possible, and to detect samples having a possibility of starting toaster fires due to excessive toaster oil drip upon reheating, a period of 5 minutes was selected for the test procedure to yield a larger margin of safety.

B. Toaster hash browns were prepared according to the procedure described in Example 6 of U.S. Pat. No. 4,419,375 and Example 1 above. For the '375 products, hash brown patties produced with predried shreds mixed with ground frozen retrograded binder were formed in the Hollymatic former, fried horizontally and frozen. Toaster oil drip results were obtained for individual patties made by both processes and reheated for periods of 3, 4 and 5 minutes.

TABLE 11

| Minutes in Toaster | Toaster Drip | |
|---|---|---|
| | '375 Patent oil Drip, mg | Example 1 oil Drip, mg |
| 3.00 | 12 | 0.22 |
| 4.00 | 141 | 0.37 |
| 5.00 | 591 | 6.98 |

A by-product of conventional french-fry manufacture are so-called "shake outs"-- the undersized, broken or misshapen products which are unsuitable for sale. After initial peeling, slicing into french-fry shape and blanching, the sliced potatoes are partially fried, in hot cooking oil, resulting in a par-fried french fry having from about 15–20% oil (by weight). The par-fried product is then frozen for packaging and distribution to restaurants and retail outlets. The "shake-outs" are removed prior to packaging. Little can be made of such shake-outs, and their use as animal feed belies their value-added status. The present example uses such shake-outs in the manufacture of the inventive dry binder.

Example 8

Conventional frozen french-fry shake-outs were dried in a Proctor and Schwartz oven at 120° F. (49° C.) for about 12 hours. Final moisture content was 6.4%. The dried shake-outs were ground in a conventional hammermill sufficiently such that most if not all of the ground product should pass through a standard U.S. 40 mesh screen. However, due to the relatively high oil content of the sample, the comminuted potato solids agglomerated, making screening impractical. This dry binder was added to potato shreds as in Example 1 above. Two samples (B and C) of representative shake-outs were tested against the dry binder prepared according to Example 1 above (A). The patties were fried for 80 seconds at 385° F. (196° C.) in a vertical orientation.

TABLE 12

| Sample | Ave Toaster Drip (6 Samples) mg | Patty Wt. loss in Toaster (gm) | Oil Content | Fried Patty Moisture | Physical Appearance | |
|---|---|---|---|---|---|---|
| | | | | | Surface[1] | Sag[1] |
| A | 142.9 | 4.2 | 8.6 | 65.8 | 1.0 | 2.0 |
| B | 273.2 | 6.1 | 12.7 | 59.7 | 1.5 | 2.0 |
| C | 381.1 | 6.3 | 12.7 | 63.8 | 2.0 | 2.0 |
| D | 333.9 | 6.6 | 10.1 | 62.6 | 1.5 | 2.0 |

[1]Scale 1-5, 1 best-5 worst.

As shown in Table 12, while the drip from the preferred dry binder of Sample A is higher than that reported above, it is well within the preferred range of less than 150 mg drip per patty. The drip observed with the dry binder from french-fry shake-outs was substantially higher, but less than that observed with a number of commercially available toaster products. It is believed that the par-fried potatoes used to make the dry binder of Samples B and C, having an oil content of 16.2% and 19.5% respectively, interferes to some degree with the film-forming capability of the dry binder. As can be seen, Samples B and C lost more weight during reheating and had a lower final moisture content than did Sample A—apparently an indication that the impervious film formed around the patty does not function as well in the presence of higher levels of oil in the dry binder. The higher oil content is an indication both of this feature and of the higher initial oil content of the french fry shake-outs. However, the overall physical attributes of the patties produced with the dry binders of Samples B and C was acceptable.

Therefore, the use of french fry shake-outs as a potato solids source for the dry binder of the present invention is evident, providing a higher use for this previously low-value product.

Example 9

Finally, freeze-dried potatoes were tested as a source of potato solids for the manufacture of the dry binder. Freeze-dried potato pieces were removed from packages of freeze-dried beef stew and tested with the products of Example 8. As shown in Table 12, the products (Sample D) made with a dry binder from freeze-dried potatoes performed similar to the frozen shake-outs. While exhibiting a higher toaster drip than the preferred embodiment of Sample A, the drip is lower than that of other commercially available products.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. A process for producing toaster hash brown potato patties wherein a dry binder is added to fresh potato shreds, said process comprising:
   a. slicing and blanching fresh raw potatoes;
   b. cooling the potatoes from step a to at least ambient air temperature for a period of time sufficient to allow the potatoes to equilibrate at said temperature and substantially retrograde the potato starch therein;
   c. shredding the potatoes of step b;
   d. adding a mixture of water and a dry binder in a ratio of from about 0.5:1:0 to about 5.0:1.0 respectively, to the potato shreds of step c to form a product; the dry binder being finely ground potato solids in which the amylose contained therein has been substantially retrograded and which are thereafter dried to a moisture content of less than about 8% at a temperature less than the resolubilization temperature of said retrograded amylose;
   e. forming the product of step d into a hash brown potato patty, and frying said patty; and
   f. freezing the patty of step f, and
   g. reheating said frozen hash brown potato patty in a standard household toaster for consumption.

2. The process of claim 2, further comprising cooling the potatoes of step b to a temperature at least as low as about 55° F.

3. The process of claim 2, further comprising cooling said potatoes to a temperature of about 35° F. and holding the potatoes at said temperature for at least about 15 minutes.

4. The process of claim 1, further comprising adding water to said potato shreds prior to the addition of said dry binder thereto, such that sufficient water is available to hydrate the dry binder.

5. The process as recited in claim 1, further comprising mixing the water with the dry binder prior to the addition of said binder to the potato shreds.

6. The process as recited in claim 1, further comprising adding water to the potato shreds, such that said shreds are relatively uniformly coated with water, and thereafter adding said dry binder thereto.

7. The process of claim 1, further comprising forming the hash brown potato patty with upper and lower planar surfaces.

8. The process of claim 7, further comprising frying said hash brown potato patty such that the upper and lower planar surfaces are aligned in a vertical orientation.

9. The process as recited in claim 8, further comprising raising the surface temperature of said patty above the resolubilization temperature of said retrograded amylose, such that a relatively oil-impermeable layer is formed around the periphery of said patty.

10. The process as recited in claim 1, further comprising grinding said potato solids such that they pass through a standard U.S. 40 mesh screen.

11. The process as recited in claim 1, further comprising adding said dry binder to said potato shreds at a rate of about 3% to about 50%, on a dry solids basis.

12. The process as recited in claim 11, further comprising adding said dry binder to said potato shreds at a rate of about 10% to about 18%, on a dry solids basis.

13. A process for producing a toaster hash brown potato patty comprising:
   a. slicing and blanching fresh raw potatoes;
   b. cooling a first portion of the potatoes of step a to substantially retrograde all of the potato starch therein;
   c. shredding the first portion of potatoes of step b;
   d. adding water and a finely ground second portion of the potatoes of step a in the form of a dry binder in a ratio of from about 0.5–2.0:1.0 respectively to the potato shreds of step c to form a product; the dry binder having the amylose content therein substantially retrograded, and dried to a moisture content of less than about 8% at a temperature less than the resolubilization temperature of said retrograded amylose;
   e. forming the product of step d into a hash brown potato patty having upper and lower planar surfaces;
   f. frying the hash brown potato patty of step f such that the upper and lower planar surfaces are aligned in a vertical orientation at a temperature above the resolubilization temperature of said retrograded amylose;
   g. freezing the hash brown potato patties of step f; and
   h. reheating the frozen hash brown potato patties in a standard household toaster.

14. The process of claim 13, further comprising providing a hash brown potato patty which after frying loses a maximum of from about 50 to about 150 mg of frying oil per patty in the form of drips during reheating in said toaster.

15. The process of claim 13, further comprising making a mixture of the water and dry binder, and subsequently adding said mixture to the potato shreds.

16. The process as recited in claim 13, further comprisng adding water to said potato shreds, and thereafter adding the dry binder thereto.

17. The process as recited in claim 16, further comprising adding sufficient water to the potato shreds to uniformly coat said shreds with water, and provide sufficient water to completely hydrate said dry binder.

18. The process as recited in claim 13, further comprising forming a relatively oil-insoluble layer of resolubilized retrograded anylose around the periphery of said patty.

19. A process for producing frozen potato products wherein a dry binder is added to fresh potato solids, comprising the steps of:
   a. blanching a quantity of potato solids;
   b. cooling the potato solids from step a to at least ambient air temperature for a period of time sufficient to allow the potato solids to equilibrate at said temperature and substantially retrograde the potato starch therein;
   c. drying a first portion of step b to a moisture content of about 8% at a temperature less than the resolubilization temperature of the potato starch;
   d. comminuting said dried first portion of said potato solids of step c to a size sufficient to pass through a U.S. No. 40 mesh screen;
   e. comminuting a second portion of said potato solids of step b;
   f. adding the dried first portion of said potato solids from step d to the second portion of step e;
   g. forming the first and second portions of step f into an appropriate shape;
   h. frying the shaped first and second portions in hot cooking oil; and
   i. freezing the fried first and second portions.

20. The process of claim 19, further comprising cooling the potato solids of step b to a temperature less than 40° F. and holding at said temperature for at least 15 minutes.

21. The process of claim 19, further comprising cooling the second portion of step e prior to the addition of the first portion.

22. The process of claim 19, further comprising adding water to the second portion prior to the addition of the first portion, such that individual potato pieces of the second portion are substantially coated with water.

23. The process of claim 22, further comprising adding water to the dried first portion of step f in a ratio of from about 0.5–5.0:1.0 respectively.

24. The process of claim 19, further comprising drying the first portion at a temperature of from about 110° F. to about 200° F.

25. The process of claim 19, further comprising resolubilizing the retrograded potato starch during frying, such that a relatively oil-impermeable layer of retrograded potato starch is formed about the periphery of said potato products.

26. The process of claim 19, further comprising adding from about 3% to about 50% of said dried first portion of step d to the second portion of step e.

27. The process of claim 26, further comprising adding from about 10% to about 18% of the dried first portion to the second portion.

28. The process of claim 1, further comprising freezing the potato solids of the dry binder of step d prior to drying said potato solids.

29. The process of recited in claim 13, further comprising freezing the dry binder of step d prior to drying.

30. The process of claim 19, further comprising freezing the first portion of step c.

31. A process for producing frozen potato products wherein a dry binder is added to fresh potato solids, comprising the steps of:
   a. slicing and blanching a quantity of potato solids;
   b. partially frying a first portion of the potato solids of step a;
   c. freezing the potato solids of step b, to substantially retrograde the amylose contained therein;
   d. drying the potato solids of step c to a moisture content of less than about 8% at a temperature less than the resolubilization temperature of said retrograded amylose;
   e. comminuting the potato solids of step d to a size sufficient to pass through a U.S. No. 40 mesh screen;
   f. cooling and comminuting a second portion of the potato solids of step a;
   g. adding the potato solids of step f to the potato solids of step e and forming the potato solids into an appropriate shape; and
   h. frying and freezing the shaped potato solids of step g.

32. The process of claim 31, further comprising adding water to the dried first portion of step e in a ratio of from about 0.5–5.0:1.0 respectively, prior to adding to the second portion of step f.

33. The process of claim 31, further comprising drying the first portion at a temperature of from about 110° F. to about 200° F.

34. The process of claim 31, further comprising resolubilizing the retrograded potato starch during frying, such that a relatively oil-impermeable layer of retrograded potato starch is formed around the periphery of said potato products.

35. The process of claim 31, further comprising adding from about 3% to about 50% of said dried first portion of step e to the second portion of step f.

36. The process of claim 35, further comprising adding from about 10% to about 18% of the dried first portion to the second portion.

* * * * *